(12) United States Patent
Ishikawa et al.

(10) Patent No.: US 8,114,528 B2
(45) Date of Patent: Feb. 14, 2012

(54) ELECTRON BEAM WELDED JOINT EXCELLENT IN BRITTLE FRACTURE RESISTANCE

(75) Inventors: Tadashi Ishikawa, Futtsu (JP); Ryuichi Honma, Futtsu (JP); Akihiko Kojima, Futtsu (JP); Yuzuru Yoshida, Tokyo (JP); Youichi Tanaka, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 393 days.

(21) Appl. No.: 12/442,665

(22) PCT Filed: Jan. 12, 2007

(86) PCT No.: PCT/JP2007/050738
§ 371 (c)(1),
(2), (4) Date: Mar. 24, 2009

(87) PCT Pub. No.: WO2008/041372
PCT Pub. Date: Apr. 10, 2008

(65) Prior Publication Data
US 2010/0028717 A1    Feb. 4, 2010

(30) Foreign Application Priority Data

Oct. 2, 2006 (JP) .................. 2006-270967
Oct. 2, 2006 (JP) .................. 2006-271044
Oct. 2, 2006 (JP) .................. 2006-271074

(51) Int. Cl.
*B32B 15/18* (2006.01)
(52) U.S. Cl. .................... 428/683; 428/686

(58) Field of Classification Search .............. None
See application file for complete search history.

(56) References Cited

U.S. PATENT DOCUMENTS 6,308,882 B1 * 10/2001 Shuster et al. ............... 228/175
7,829,202 B2   11/2010 Ishikawa et al.

FOREIGN PATENT DOCUMENTS

| EP | 0 867 520 A2 |   | 9/1998 |
|----|----|----|----|
| EP | 1 695 785 A1 |   | 8/2006 |
| FR | 2591517 | * | 6/1987 |
| JP | 55-120493 | * | 9/1980 |
| JP | 58-61981 A |   | 4/1983 |
| JP | 60-54287 | * | 3/1985 |
| JP | 63-242477 | * | 10/1988 |
| JP | 2-85339 A |   | 3/1990 |

(Continued)

OTHER PUBLICATIONS

English machine translation of JP 2002-003984, published Jan. 2002.*

(Continued)

*Primary Examiner* — John J Zimmerman
(74) *Attorney, Agent, or Firm* — Birch, Stewart, Kolasch & Birch, LLP (57) ABSTRACT

To form a welded joint having a sufficiently high fracture toughness value δc by butting welding high strength steel plates having a yield strength of the 355 MPa class or more and a plate thickness of over 50 mm by electron beam welding, the butt welded joint is made one where the hardness of the weld metal is 110% to 220% of the hardness of the base material and where the width of the weld metal is 20% A or less of the base material plate thickness.

9 Claims, 6 Drawing Sheets

FOREIGN PATENT DOCUMENTS

| | | | |
|---|---|---|---|
| JP | 2-282466 A | | 11/1990 |
| JP | 3-248783 A | | 11/1991 |
| JP | 6-670 | * | 1/1994 |
| JP | 7-51872 | * | 2/1995 |
| JP | 7-265941 A | | 10/1995 |
| JP | 8-155658 A | | 6/1996 |
| JP | 2001-287051 A | | 10/2001 |
| JP | 2002-3984 A | | 1/2002 |
| JP | 2003-201535 A | | 7/2003 |
| JP | 2003-245787 A | | 9/2003 |
| JP | 2005-125393 A | | 5/2005 |
| JP | 2005-144552 A | | 6/2005 |
| JP | 2005-330578 A | | 12/2005 |

OTHER PUBLICATIONS

Supplemental European Search Report, issued in application No. 07707042.3 on Aug. 27, 2009.

Preprints of the National Meeting of J.W.S. No. 30 (Spring 1982), pp. 30-31, including an English translation.

* cited by examiner

ELECTRON BEAM WELDED JOINT EXCELLENT IN BRITTLE FRACTURE RESISTANCE

TECHNICAL FIELD

The present invention relates to an electron beam welded joint excellent in brittle fracture resistance of a welded structure, in particular, a welded structure comprised by butt welding steel plates of a plate thickness of over 50 mm.

BACKGROUND ART

There is an extremely high need in society for escaping from dependence on oil and other fossil fuel energy and utilizing sustainable natural energy. Large-sized wind power generation systems are consequently spreading throughout the world.

The regions most suitable for wind power generation are regions at which continuously strong winds can be expected. Offshore wind power generation is also being realized on a global scale. For construction of wind power towers offshore, the base parts of the towers must be driven into the foundation of the seabed. To secure sufficient height of the turbine blades of the wind power towers from the surface of the water, the base parts also have to be of sufficient lengths.

For this reason, the base parts of the wind power towers are tubular structures having plate thicknesses of about 100 mm and large cross-sections of diameters of about 4 m. The overall heights of the towers reach as high as 80 m or more. Assembly of such giant structures on the seashore close to the construction sites simply and efficiently by welding is therefore being sought.

Therefore, in the above way, a never before seen need has arisen for welding extremely thick steel plates of a plate thickness of as much as 100 mm by a high efficiency on-site.

In general, the electron beam welding method is a welding method enabling efficient welding by a high density, high energy beam, but it is necessary to perform the welding in a vacuum chamber while maintaining a high vacuum state, so in the past the size of the weldable steel plate was limited.

As opposed to this, in recent years, as a welding method enabling efficient on-site welding of extremely thick steel plate of a plate thickness of about 100 mm, reduced pressure electron beam welding (RPEBW) has been developed and proposed by the Welding Institute of Great Britain (see WO99/16101).

By using this RPEBW method, even when welding large-sized structures like wind power towers, it is expected to become possible locally reduce the pressure of and efficiently weld just the parts to be welded.

However, on the other hand, with this RPEBW method, the welding is performed in a state of a reduced degree of vacuum compared with the method of welding in a vacuum chamber, so the new issue has arisen that securing the toughness of the melted metal part which was melted by the electron beam, then solidified (hereinafter referred to as the "weld metal") becomes difficult.

To deal with such a problem, in the past, lining the welding surfaces with sheets of Ni or another insert metal and then performing the electron beam welding so as to make the Ni content of the weld metal 0.1 to 4.5% and improve the Charpy impact value and other toughness values of the weld metal is known by Japanese Patent Publication (A) No. 3-248783 etc.

However, when using the RPEBW method for welding, with this method, the Ni and other elements in the insert metal will not uniformly disperse to the heat affected zone. Rather, they will increase the difference in hardness between the weld metal and heat affected zone (hereinafter referred to as the "HAZ"). Therefore, conversely, the problem of a large variation in the toughness of the HAZ surfaced.

In general, as an indicator for quantitative evaluation of the safety of a welded structure, the fracture toughness value $\delta c$ based on fracture dynamics found by a CTOD test is known. A welded joint obtained by welding by the conventional RPEBW method has a large variation in the toughness of the heat affected zone, so it was difficult to secure a sufficient fracture toughness value $\delta c$.

On the other hand, to secure the fracture toughness value Kc in an electrogas welded or other large heat input welded joint, the method of controlling the hardness ratio of the weld metal and the base material to 110% or less to improve the fracture toughness Kc of the boundary (hereinafter also referred to as the "FL") between the weld metal and the base material is disclosed in Japanese Patent Publication (A) No. 2005-144552.

However, securing the fracture toughness value $\delta c$ of the electron beam welded joint requires that both the FL and the weld metal be satisfactory in fracture toughness value $\delta c$. If, in the same way as with a large heat input welded joint, the hardness of the base material is reduced to 110% or less, the problem will arise that the fracture toughness value of the weld metal at the electron beam welded joint will not be able to be secured.

Further, the electron beam welding method is a method of using the energy of an electron beam to melt once, resolidify, then weld the base material of the weld zone. It is difficult to control the hardness of the weld metal, the fracture toughness value $\delta c$, and other characteristics by the welding wire etc. as easily as like with electrogas welding or other large heat input arc welding.

DISCLOSURE OF INVENTION

In consideration of the above prior art, the present invention has as its object the provision of a means for improving the fracture toughness value $\delta c$ of both the weld metal at an electron beam welded joint and the boundary (FL) between the weld metal, at which the local stress particularly increases, and the heat affected zone and stably improve the fracture toughness of the welded joint.

The inventors investigated the mechanical properties of the base material and welded joint to achieve this object. As a result, they discovered that due to the presence of the insert metal used for improving the toughness of the weld metal, the strength or hardness of the weld metal rose and became remarkably higher than even the strength or hardness of the base material, so local stress increased near the boundary with the heat affected zone (HAZ) in contact with the weld metal and therefore the fracture toughness value $\delta c$ of the FL fell.

Further, based on this discovery, the inventors made the present invention as new joint design technology giving a welded joint able to prevent a drop in joint toughness by over matching and able to secure excellent toughness stably in electron beam welding of high strength thick steel plate having a yield strength of the 355 MPa class or more and a plate thickness of over 50 mm (preferably over 50 mm to 100 mm or so).

The gist of the present invention is as follows:

(1) An electron beam welded joint excellent in brittle fracture resistance in a butt welded joint of a welded structure characterized in that a hardness of a weld metal is over 110% to 220% of a hardness of a base material and in that a width of the weld metal is 20% or less of a plate thickness of the base material.

(2) An electron beam welded joint as set forth in (1), the electron beam welded joint characterized by containing, as a base material, by mass %, C: 0.02 to 0.2%, Mn: 0.8 to 3.5%, S: 0.0005 to 0.0025%, Al: less than 0.02%, and Ti: 0.01 to 0.05%, using a steel material having a value of Pcm expressed by the following formula (a) of 0.12% to 0.5% material, having an amount of O contained in the weld metal of the welded joint of 20 ppm or more, and similarly having an amount of oxides of a grain size of 2.0 μm or more of 10/mm² or less:

$$Pcm=C+Si/30+Mn/20+Cu/20+Ni/60+Cr/20+Mo/15+V/10+5B \quad (a)$$

(3) An electron beam welded joint as set forth in (2), the electron beam welded joint characterized in that an amount of Ti oxides having a grain size of 0.1 μm to less than 2.0 μm is 30 to 600/mm².

(4) An electron beam welded joint as set forth in (1), the electron beam welded joint characterized in that the weld metal of the welded joint contains Ni in an amount of 1 to 4 mass % and contains it in an amount 0.2 mass % or more greater than the content in the base material.

(5) An electron beam welded joint as set forth in (4), the electron beam welded joint characterized in that the weld metal contains B in an amount of 10 ppm or less.

(6) An electron beam welded joint as set forth in (1), the electron beam welded joint characterized by using as the base material a steel material containing Ni in an amount of 2.5 mass % or more and in that a content of Ni contained in the weld metal of the welded joint is, by mass %, over 4% to 8%.

(7) An electron beam welded joint as set forth in any one of (1) to (6), the electron beam welded joint characterized in that the welded structure comprises high strength steel plates having a plate thickness of over 50 mm butt welded together.

According to the present invention, it is possible to form a welded joint with a sufficiently high fracture toughness value δc when electron beam welding high strength steel plates having a yield strength of the 355 MPa class and a plate thickness of over 50 mm.

Furthermore, even in the case of not using an insert metal, it is possible to reliably achieve the object of the present invention in accordance with the Ni content of the base material.

BEST MODE FOR CARRYING OUT THE INVENTION

In a general electron beam welded joint, it is difficult to secure the required fracture toughness δc at the weld metal formed by melting and resolidification of part of the base material. For this reason, in the past, the method has been known of inserting nickel foil or another insert metal into the welding groove part at the time of electron beam welding so as to improve the hardenability of the weld metal and to use this synergistic effect to secure the fracture toughness value δc.

However, the inventors discovered that with this method, the fracture toughness value δc of the heat affected zone at the electron beam welded joint, in particular the boundary between the weld metal and the heat affected zone (FL), greatly falls and the fracture toughness value δc of the electron beam welded joint cannot be sufficiently secured.

Therefore, the inventors prepared steel plates having yield strengths of the 460 MPa class, inserted insert metal having an Ni content of 4% to the weld grooves, welded them by electron beam welding, and measured and evaluated the fracture toughness value δc of the obtained welded joints by CTOD tests.

As a result of the CTOD tests of the welded joints, it was learned that the weld metal exhibited sufficiently high fracture toughness values δc of 0.2 mm or more, but the boundary (FL) between the weld metal and HAZ exhibited fracture toughness values δc of extremely low values of 0.02 mm or less.

Next, the inventors investigated in detail the points of occurrence of fractures of the welded joints in the CTOD tests. As a result, they discovered that (i) the fractures occurred at the boundary (fusion line [FL]) of the weld metal (WM) and heat affected zone (HAZ) and, as a result of analysis by the 3D finite element method of the distribution of the local stress forming the driving force of fractures in CTOD tests of the welded joints, that (ii) the local stress of the FL is remarkably influenced by the hardness of the adjoining weld metal (WM).

Figure 3:
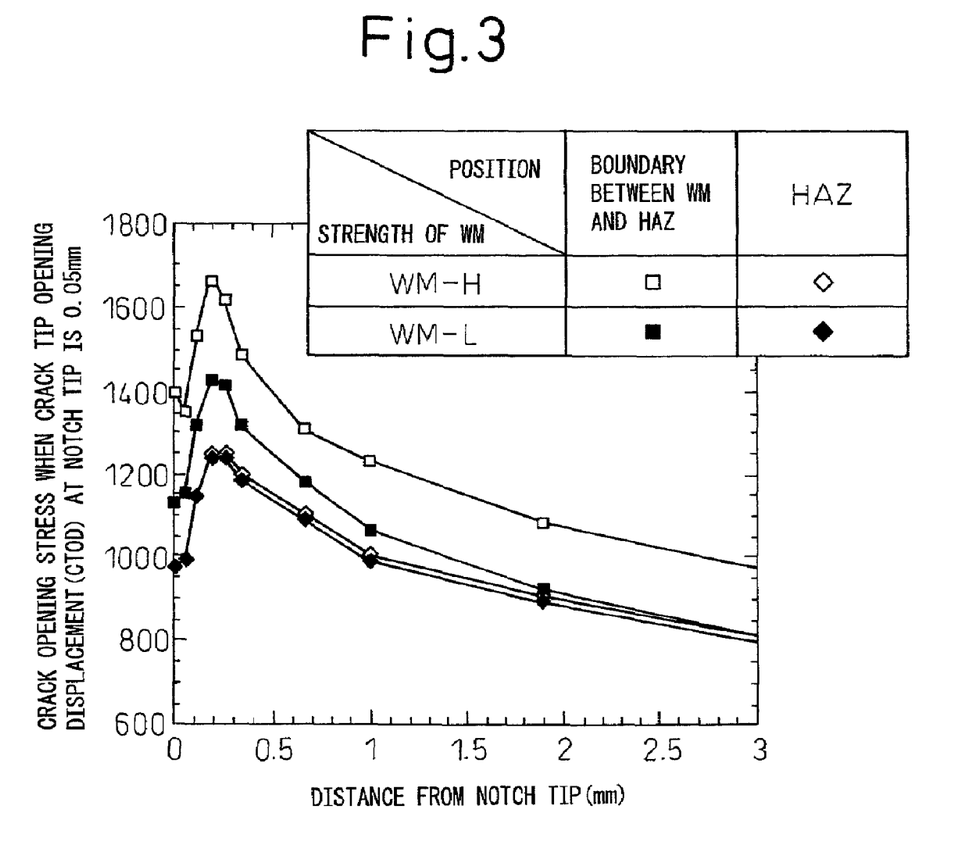
FIG. 3 is a view showing an example of the results of analysis by the FEM (3D finite element method) of the crack opening stress distribution at different positions separated from the notch tip in the crack propagation direction when providing notches at the boundary (FL) of the weld metal (WM) and heat affected zone (HAZ) and at the heat affected zone (HAZ) in test specimens having a plate thickness of 70 mm and the CTOD (crack tip opening displacement) at the notch tips becomes 0.05 mm.

FIG. 3 shows an example of the results of analysis by the FEM (3D finite element method) of the crack opening stress distribution at different positions separated from the notch tip in the crack propagation direction when providing notches at the boundary (FL) of the weld metal (WM) and heat affected zone (HAZ) and at the heat affected zone (HAZ) in test specimens having a plate thickness of 70 mm and the CTOD (crack tip opening displacement) at the notch tips becomes 0.05 mm.

From this drawing, it is learned that (iii) if the plate thickness becomes over 50 mm to about 70 mm, the degree of constraint in the plate thickness direction (constraining force) remarkably increases and if the strength of the weld metal (WM) is higher than the strength of the base material (BM) or the heat affected zone (HAZ) (case of WM-H), the local stress remarkably increases at the boundary (FL) of the weld metal (WM) and the heat affected zone (HAZ) (in the figure, see □[WM-H] and ■[WM-L]).

On the other hand, even if the strength of the weld metal (WM) is higher than the strength of the base material (BM) or the heat affected zone (HAZ) (case of WM-H), the local stress does not increase at the heat affected zone (HAZ) but becomes substantially the same as the case of a low strength of the weld metal (WM) (case of WM-L).

From this, the reason why the δc value falls is believed to be that the local stress increases at the boundary (FL) of the weld metal (WM) and heat affected zone (HAZ) when the strength of the weld metal (WM) is higher than the strength of the base material (BM) or heat affected zone (HAZ) (case of WM-H).

That is, as a result of the above analysis, the inventors discovered that (iv) to suppress a remarkable increase in the local stress at the boundary (FL) of the weld metal (WM) and heat affected zone (HAZ) and raise the δc value, it is necessary to make the strength of the weld metal (WM) as low as possible.

However, the inventors discovered that if reducing the hardness of the weld metal, it is not possible to secure hardenability of the weld metal (WM), so coarse ferrites are formed and as a result the CTOD value falls.

Figure 1:
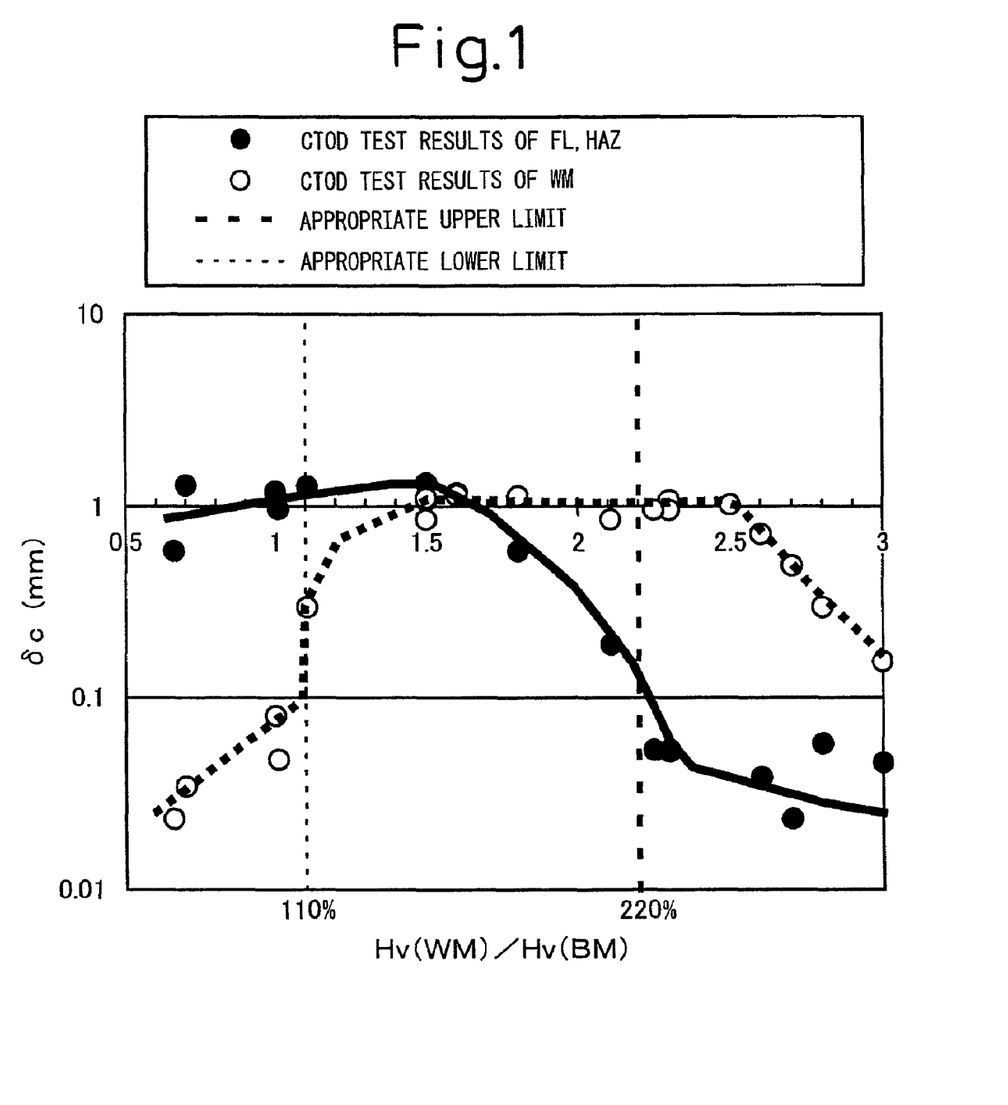
FIG. 1 is a view showing the effect of the hardnesses of the weld metal (WM) and the base material on the δc values of the weld metal and the HAZ-FL.

Therefore, based on the above results of analysis, the inventors changed the hardness of the weld metal [Hv(WM)] in various ways, measured the CTOD value δc of the FL, and plotted the δc value against the "hardness of the weld metal [Hv(WM)]/hardness of the base material [Hv(BM)]" and, as a result, as shown by the "●" in FIG. 1, discovered that if suppressing the hardness of the weld metal [Hv(WM)] to 220% or less of the hardness of the base material [Hv(BM)], it is possible to prevent a drop in the fracture toughness value δc due to the increase in the local stress.

The higher then δc value the better, but in the standards of the Det Norske Veritas (DNV) etc., a value of about 0.1 to 0.2 mm is required at the design temperature. Based on this, in the present invention, the target δc value was made 0.15 mm or more.

Note that in an electron beam welded joint obtained by the conventional method, it was difficult to stably secure a fracture toughness value δc at −20° C. of 0.15 mm or more.

In this way, by making the hardness of the weld metal [Hv(WM)] lower than the hardness of the base material [Hv(BM)], the δc of the FL is improved, but if excessively reducing the hardness of the weld metal [Hv(WM)], the δc value of the weld metal falls and as a result it is not possible to secure the fracture toughness value δc of the electron beam welded joint.

The inventors studied this and as a result discovered that, as shown by the ○ marks in FIG. 1, if securing a hardness of the weld metal [Hv(WM)] of 110% or more of the hardness of the base material [Hv(BM)], it is possible to secure the required CTOD value at the weld metal.

Figure 2:
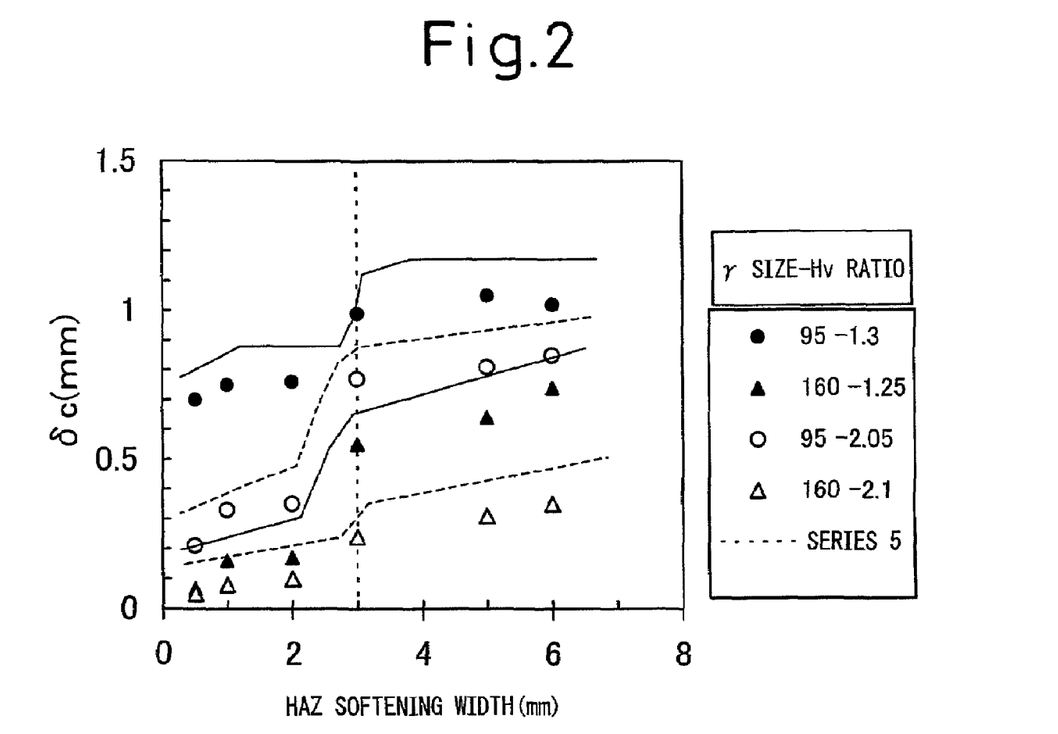
FIG. 2 is a view showing the effects of the hardness ratio of the weld metal and the base material and the γ grain size on the relationship of the HAZ softening width and CTOD values of the HAZ-FL.

The effects of the hardness ratio of the weld metal and the base material and the γ grain size on the relationship between the HAZ softening width and the CTOD value of the FL are shown in FIG. 2. The broader the HAZ width, the more improved the CTOD value of the FL tends to be. This is because softening of the HAZ causes the effects of strength matching to be eased. The HAZ width is preferably 3 mm or more.

Further, the inventors discovered that the distribution where no local stress occurs at the fusion line (FL) contacting the weld metal is governed by the hardness of the weld metal, but when the "softened region" in the HAZ region contacting the FL is large, the local stress of the FL tends to be eased.

According to the results of the experiments shown in FIG. 2, the broader the HAZ softening width, the more this eased phenomenon is observed. If 3 mm or more, this becomes particularly remarkable, so the HAZ softening width is preferably made 3 mm or more.

The lower the hardness of the HAZ compared with the hardness of the base material, in principle the more reduced the local stress of the FL, but according to experimental findings of the inventors, the effect of reduction of the local stress of the FL was clearly observed when the hardness of the HAZ became 5% or more lower than the hardness of the base material.

For this reason, it is preferable to make the width of the region of the heat affected zone softened to a hardness of 95% or less of the hardness of the base material not affected by the heat 3 mm or more.

Further, if the width of the region of the heat affected zone becomes 10 mm or more, strain is liable to concentrate at the softened part, so 10 mm or less is preferable from the viewpoint of securing the joint strength or the fatigue strength.

To secure the predetermined CTOD value δc at the welded joint, it is critical that the local stress be prevented from increasing at the most fragile part of the welded joint, that is, the fusion line (FL), as explained above, but at the same time, it is important to improve the microscopic brittle fracture resistance near the FL.

The inventors investigated and studied the mechanism of occurrence of brittle fracture near the FL and as a result discovered that the pro-eutectoid ferrite formed around the prior austenite and the upper bainite and ferrite side plates etc. formed in laths inside the prior austenite became the starting points of fracture.

The fracture unit when this upper bainite or ferrite fractures by cleavage depends on the grain size of the austenite phase, so the inventors discovered that by keeping the prior austenite grain size small, it is possible to keep the dimensions of the upper bainite and ferrite small and improve the brittle fracture resistance.

Further, as a result of the inventors' studies, if the "hardness of weld metal [Hv(WM)]/hardness of base material [Hv(BM)]" approaches the 220% prescribed in the present invention, the drop in the fracture toughness value δc due to the strength matching of the weld metal and HAZ and the effects of the structure can no longer be ignored.

Therefore, to stably secure the fracture toughness value δc of the joint even under such conditions, it is preferable to make the prior austenite grain size of the heat affected zone (HAZ) contacting the fusion line (FL) 100 μm or less and suppress coarsening of the prior austenite grain size (see FIG. 2).

Further, if the region irradiated by the electron beam at the time of electron beam welding becomes larger, the amount of heat input given to the steel plate will become excessive and the structure of the FL will end up becoming coarser. This is not desirable in stably securing the fracture toughness value δc of the FL.

Further, when using the RPEBW method to produce an electron beam welded joint, the width of the weld metal tends to increase compared with a welded joint produced in a vacuum chamber in a high vacuum state by electron beam welding (EBW).

For this reason, in the present invention, to stably secure the fracture toughness value δc of the electron beam welded joint even when using the RPEBW method, the width of the weld metal is made 20% or less of the plate thickness of the base material.

The high strength steel plate of the welded structure used in the present invention may be produced from steel for welded structures of known compositions of ingredients. For example, steel based on steel containing, by mass %, C: 0.02 to 0.20%, Si: 0.01 to 1.0%, Mn: 0.3 to 2.0%, Al: 0.001 to 0.20%, N: 0.02% or less, P: 0.01% or less, and S: 0.01% or less and having a balance of Fe and unavoidable impurities and further containing, for improvement of the base material strength or joint toughness etc. or other required properties, one or more of Ni, Cr, Mo, Cu, W, Co, V, Nb, Ti, Zr, Ta, Hf, REM, Y, Ca, Mg, Te, Se, and B, is preferable.

The plate thickness of the steel plate is not particularly limited, but the above problems surface in high strength steel plate having a plate thickness of over 50 mm.

To keep the ratio of the hardness of the weld metal and the hardness of the base material in the range of the present invention, it is necessary to prevent coarse ferrite from forming in the weld metal as much as possible. Toward this end, insert metal is used or not used and the chemical components are adjusted in accordance with the hardenability of the base material and the plate thickness.

When using an insert metal, an Ni alloy or an Fe alloy containing Ni is used, but the invention is not limited to any specific composition of ingredients. This is selected in accordance with the composition of ingredients of the base material.

The electron beam welding is performed, for example in the case of a plate thickness of 80 mm, under the conditions of a voltage of 175V, a current of 120 mA, and a welding speed of 125 mm/min or so. Normally, the welding is performed under a high vacuum of $10^{-3}$ mbar or less, but even a joint welded under a low vacuum able to be obtained even by a simple facility, for example, a vacuum of 1 mbar or so, is within the range of the present invention.

Next, the inventors studied the conditions for more stably obtaining an excellent fracture toughness value δc under conditions of a hardness of the weld metal of over 110% to 220% of the hardness of the base material when not using and when using an insert metal.

(A) Case of not Using Insert Metal

When not using an insert metal, part of the base material melts and resolidifies to form the weld metal, so with just defining the ratio of hardness of the weld metal and the base material, a limit arises as to the fracture toughness value δc which can be secured at the weld metal.

In the past, as the means for improving the toughness of an electron beam welded joint without using an insert metal, for example, the art proposed in Japanese Patent Publication (A) No. 62-64486, Japanese Patent Publication (A) No. 2003-201535, etc. has been known.

This art causes the formation of a large number of fine oxide-based nonmetallic inclusions in the cooling process after the welding, utilizes these inclusions as the nuclei for transformation when austenite transforms to ferrite, and forms a microstructure containing a large amount of fine acicular ferrite exhibiting excellent toughness to thereby obtain weld metal superior in toughness.

Therefore, from the viewpoint of preventing a drop in the joint toughness due to over matching of the hardness of the base material and the weld metal, the inventors worked to further develop the art described in the above patent publications of utilizing fine oxides to improve the microstructure of the weld metal and studied art for obtaining a welded joint able to improve the fracture toughness value δc of both the weld metal and the FL and able to stably secure fracture toughness of the welded joint when not using an insert metal.

Further, in the process, they discovered that when the weld metal includes at least a certain frequency of inclusions of a specific size, the fracture toughness value δc fluctuates. That is, they investigated in detail the points where fractures occurred in CTOD tests of electron beam welded joints formed using steel plates in which Ti was added to make fine oxides disperse in them and as a result discovered that fractures in the CTOD tests started from oxides of a certain size or more and that by reducing the frequency of presence of such oxides, it is possible to reduce the fluctuations in the fracture toughness value δc in CTOD tests.

Below, the experiments by which the above discoveries were obtained will be explained.

The inventors made steel plates of thicknesses of 70 mm containing C: 0.04%, Mn: 1.8%, S: 0.003%, Al: 0.006%, and Ti: 0.02% abut against each other and, first, to investigate the differences in welded joints due to the presence or absence of an insert metal, welded them by the RPEBW method while on the one hand (a) inserting Ni foil at the abutting parts and on the other hand (b) not inserting Ni foil there.

After the welding, they took test specimens from the welded joints at two positions of ¼ and ¾ the thickness in the thickness direction of the steel plates, made notches in the weld metal (WM) and in the boundary (FL) of the weld metal and base material and HAZ and ran CTOD tests, and investigated the changes in hardness of the welded joints.

Figure 4:
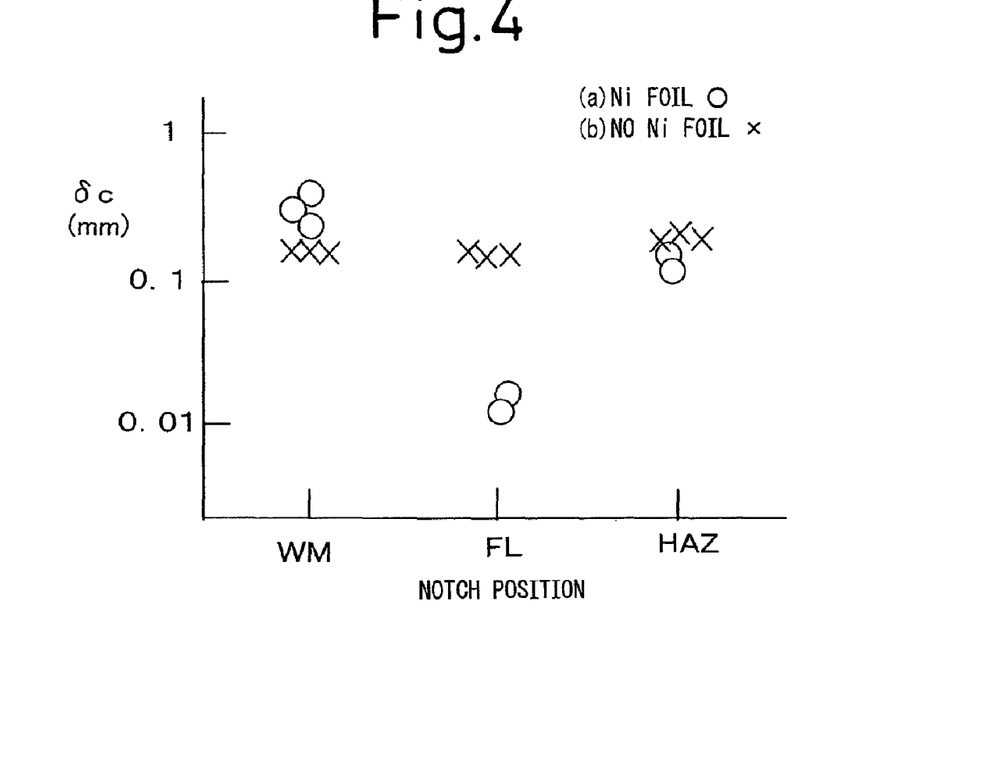
FIG. 4 is a view showing the results of CTOD tests when welding by the RPEBW method with insertion of Ni foil at the abutting parts and without insertion.
Figure 5:
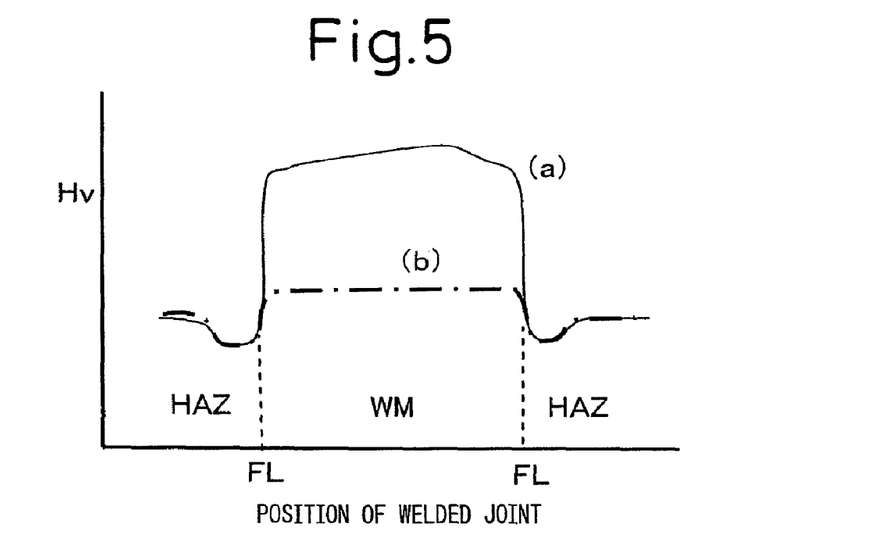
FIG. 5 is a view of changes in hardness at a welded joint in the case similar to FIG. 1.

The results of the CTOD tests are shown in FIG. 4, while the changes in hardness of the welded joints are shown in FIG. 5.

In the case of (a) when inserting Ni foil at the abutting parts, the hardness of the weld metal was high and the fracture toughness value δc at the FL fell, while in the case of (b) when not inserting Ni foil, the hardness of the weld metal was low and the extent of over matching of hardness was eased, the fracture toughness value at the FL was a value of the same extent as the weld metal, and the value of the fracture toughness value δc of the weld metal also was of an extent somewhat lower than the case of inserting Ni foil.

Next, the inventors investigated the states of dispersion of oxides of the weld metal in the cases of (a) and (b).

In the case of (b), there were 400/mm$^2$ Ti oxides of a grain size of 0.1 μm to less than 2.0 μm. These fine Ti oxides were uniformly dispersed in the weld metal. There were 2/mm$^2$ oxides of a grain size of 2 μm or more, that is, the number was small.

On the other hand, in the case of (a) as well, the state of dispersion of the oxides was similar to the case of (b). No specific difference could be observed between the two. However, in the case of (a), the hardness of the weld metal was a high one of 260% the hardness of the FL. It is believed that the local stress at the FL increased and the δc became low.

In the above way, when not inserting Ni foil, by obtaining weld metal with a suitable state of dispersion of oxides, it is possible to ease the extent of over matching between the weld metal and the HAZ. It could be confirmed that high fracture toughness values δc were obtained at the weld metal and the FL, HAZ. Therefore, the inventors further investigated the relationship between oxides in the weld metal and the fracture toughness values δc of the weld metal and FL in the case of not inserting an Ni foil.

The inventors butt welded steel plates of thicknesses of 70 mm containing C: 0.04%, Mn: 1.8%, S: 0.003%, Al: 0.006%, and Ti: 0.02% and having different oxygen contents of 10 to 250 ppm by the RPEBW method, then obtained test specimens from the weld metal at two locations of ¼ and ¾ thickness in the thickness directions of the steel plates and measured their fracture toughness values and number of oxides.

Note that for the number of inclusions, the inventors processed images obtained by a scan electron microscope (SEM) etc. to find the areas of the individual oxides, defined diameters of circles equivalent to those areas (circle equivalent diameters) as the grain sizes of the oxides, and found the number of oxides of a grain size of 2 μm or more per unit area.

Figure 6:
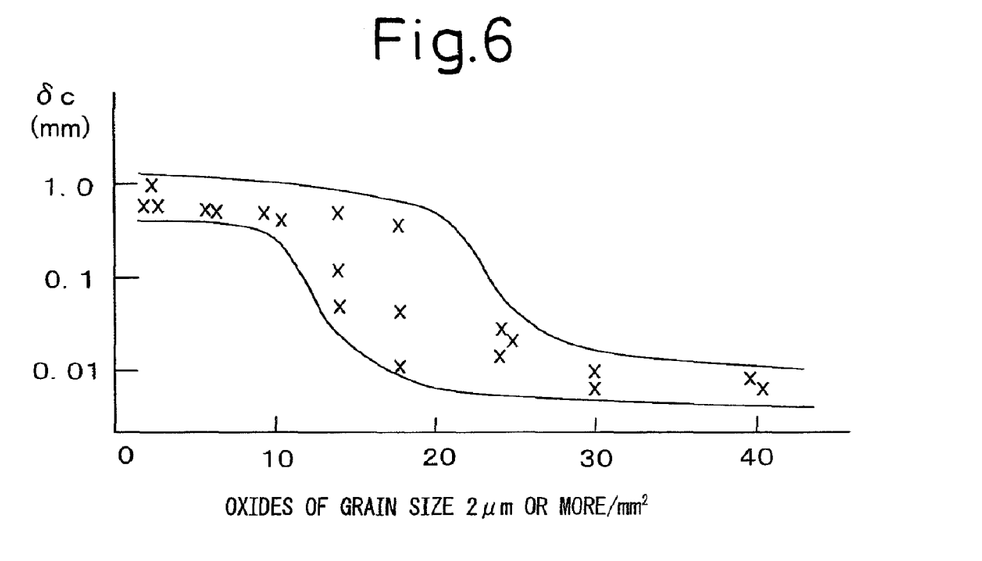
FIG. 6 is a view showing the relationship between the fracture toughness value of weld metal and the number of oxides having a grain size of 2.0 μm or more.

The results are shown in FIG. 6. It is learned that there were 10/mm$^2$ or less oxides of a size of 2 μm or more, the fluctuation in the fracture toughness value δc of the weld metal was greatly reduced, and a sufficiently high value was obtained.

Further, by similar experiments, the inventors found the type and dispersion conditions of Ti oxides giving weld metal with an excellent fracture toughness value.

As a result, they learned that if the amount of Ti oxides having a grain size of 0.1 μm to less than 2.0 μm is 30 to 600/mm$^2$, a weld metal excellent in fracture toughness value δc is obtained.

Next, the inventors further studied the chemical composition of the base material giving such a state of dispersion of oxides.

As a result, they learned that as the base material forming the welded structure, a steel material containing at least, by mass %, C: 0.02 to 0.2%, Mn: 0.8 to 3.5%, S: 0.0005 to 0.0025%, Al: less than 0.02%, and Ti: 0.01 to 0.05% and having a Pcm value of 0.12% to 0.5% should be used.

C has to be included in an amount of at least 0.02% so as to secure the strength as a welded structure, but if over 0.2%, solidification cracks easily occur.

Mn has to be included in an amount of at least 0.8% to secure strength and toughness, but if over 3.5%, the hardenability increases too much and the toughness falls.

S is an element reducing the toughness and has to be made 0.0025% or less. However, to form MnS and to utilize composites of oxides and MnS as in-grain transformation nuclei, 0.0005% or more is preferably included.

Al is usually added in the production of steel as a deoxidizing agent, but Al oxides are extremely small in ability to form ferrite transformation nuclei. In the present invention, Ti is used for deoxidation, therefore the content of Al is made less than 0.02%. 0.005% or less is more preferable. Further, it need not particularly be included.

Ti is used as a deoxidizing agent in the present invention. It is an element essential for forming Ti oxides and for improving the fracture toughness of the weld metal and HAZ by the refinement of the microstructure by the Ti oxides. To form the required Ti oxides, at least 0.01% or more is required, but if over 0.05%, oxides are liable to become excessive in amount and size and to form starting points of fracture.

O is also required in the base material for forming Ti oxides. To satisfy the conditions of the grain size and number of Ti oxides in the weld metal, it must be contained in the weld metal in at least 20 ppm or more, more preferably 40 ppm or more. The amount of oxygen in the weld metal changes in accordance with not only the content in the steel of the base material, but also in accordance with the degree of vacuum in the electron beam welding, so it is not possible to define the content in the base material across the board, but the content of O in the base material may be made 40 ppm or more with the usual high vacuum electron beam welding and further may be made 30 ppm or more with the low vacuum RPEBW. The content of O in the weld metal is preferably 250 ppm or less to satisfy the later explained conditions of grain size and number of the oxides, so the upper limit of the content of O in the base material is preferably also the same extent.

Furthermore, to keep the ratio of the hardness of the weld metal and the hardness of the base material in the above range without using an insert metal, it is necessary to secure hardenability of the weld metal and prevent the formation of pro-eutectoid ferrite in the weld metal as much as possible. For this reason, the Pcm value of the following formula (a) in the base material is made 0.12 mass % or more. Further, if the Pcm value exceeds 0.5 mass %, the hardness of the weld metal becomes too high, so the upper limit is made 0.5 mass %, but 0.38 mass % or less is more preferable.

$$Pcm=C+Si/30+Mn/20+Cu/20+Ni/60+Cr/20+Mo/15+V/10+5B \quad (a)$$

The steel material forming the base material of the electron beam welded joint in the case of not using an insert may be the above-mentioned known welding use steel so long as it satisfies the above conditions of the ingredients.

When not using an insert metal, Ti oxides are made to finely disperse and used as nuclei for transformation when austenite is transformed to ferrite so as to form a microstructure containing a large amount of fine acicular ferrite exhibiting an excellent toughness and thereby obtain a weld metal superior in toughness, but at that time, as shown in FIG. 6, it is necessary to prevent the amount of oxides having a grain size of 2.0 μm or more from exceeding 10/mm$^2$. If included in the steel exceeding that, they form starting points of fractures in the CTOD tests and become a cause of fluctuation in the fracture toughness value at the weld metal.

Further, the grain size of the Ti oxides functioning as in-grain transformation nuclei is 0.1 μm to less than 2.0 μm. By making the amount of Ti oxides having this range of grain size 30 to 600/mm$^2$, it is possible to form a microstructure containing a large amount of fine acicular ferrite.

Note that some of the fine Ti oxides will have MnS precipitated around them to thereby form composites with MnS. These composites are effective as in-grain transformation nuclei. The Ti oxides of the present invention are defined as including such composites.

To prevent the amount of oxides having a grain size of 2.0 μm or more from exceeding 10/mm$^2$ and ensure that the amount of Ti oxides having a grain size of 0.1 μm to less than 2.0 μm become 30 to 600/mm$^2$ at the weld metal, a steel material with sizes of oxides suppressed to 2.0 μm or less should be used as the base material.

For this, it is necessary to carefully control the inclusions in the process of deoxidation of the steel material forming the base material.

For deoxidizing the steel, usually Al is used, but if adding the strong deoxidizing element Al, the deoxidation reaction proceeds rapidly and large oxides of 2 μm or more end up being formed. Therefore, Ti with a smaller deoxidizing ability than Al is used for deoxidation so as to form relatively small oxides. However, once introducing a large amount of Ti, coarse oxides easily form, it is possible to control the timing of introduction of Ti so that the amount of oxygen in the molten steel is reduced step by step or introduce the weak deoxidizing element Ti, then introduce extremely small amounts of the strong deoxidizing elements Al, Ca, Mg, etc. so as to suppress the formation of coarse oxides of 2 μm or more size and to form large numbers of fine oxides of 0.1 to 2 μm size.

(B) Case of Using Insert Metal

The steel material forming the base material comes in various types including different Ni contents. Depending on the combination of the Ni content of the base material and the Ni content of the insert metal used, sometimes just adjusting the ratio of the hardness of the weld metal and the hardness of the base material does not enable a more excellent fracture toughness value δc of the welded joint to be secured.

Therefore, first, to investigate the effect of the Ni content of the weld metal, the inventors prepared steel plates having a yield strength of the 355 MPa class, inserted insert metal foil of a thickness of 0.3 mm comprised of (a) pure Ni or (b) an Fe—Ni alloy having an Ni content of 20 mass % into the weld abutting parts, and welded them by electron beam welding, then measured the obtained welded joints for the fracture toughness value δc by CTOD tests, the change in hardness, and the Ni concentration.

The inventors ran CTOD tests on the welded joints and measured the hardness. As a result, in the case of (a) using an insert metal comprised of pure Ni, the hardness of the weld metal was high and the fracture toughness value δc was a sufficiently high value of 0.2 mm or more, but the fracture toughness value δc of the FL was an extremely low value of 0.02 mm or less. On the other hand, in the case of (b) using an insert metal comprised of an Fe—Ni alloy, the hardness of the weld metal was low, the degree of over matching of the hardness was eased, and the fracture toughness value δc was a sufficiently high value of 0.2 mm or more in both the weld metal and the FL.

The inventors measured the average Ni content of the weld metal and as a result found it was 8.5 mass % in the case of (a) using an insert metal and was 2.5 mass % in the case of (b) using an insert metal. From this value, the difference in Ni content between the base material and the weld metal was 8.0 mass % in the case of (a) and 2.0 mass % in the case of (b).

From the above, it was learned that by prescribing the Ni content of the weld metal in a suitable range in relation with the Ni content of the base material, it is possible to prevent a drop in the joint toughness due to over matching of the hardness of the weld metal and the base material.

Next, to investigate the suitable range of Ni content in the weld metal and the suitable range of the difference between the Ni contents of the weld metal and base material, the inventors used the above prepared steel plates, inserted insert metals of different Ni contents into the weld grooves, welded them by electron beam welding, obtained test specimens from the obtained welded joints, made notches in the weld metal zone (WM) and HAZ sides of the FL (FL, HAZ) and ran CTOD tests to measure the fracture toughness value δc (hereinafter also sometimes referred to simply as the "CTOD value"), and evaluated the amounts of Ni required for securing the fracture toughness value δc.

The inventors divided these samples into ones with obtained δc values of excellent values of 0.15 mm or more in both the WM and FL, HAZ indicated as "○" and ones where the value was unsatisfactory in at least one of the WM and FL, HAZ indicated as "●" and plotted the amounts of Ni of the weld metal and the differences of the amounts of Ni of the weld metal and base material steel plate for these samples. The results are shown in FIG. 7.

Here, the target δc value is, as mentioned above, made 0.15 mm or more. This value is used to classify δc values into ones which are excellent and ones which are poor.

Figure 7:
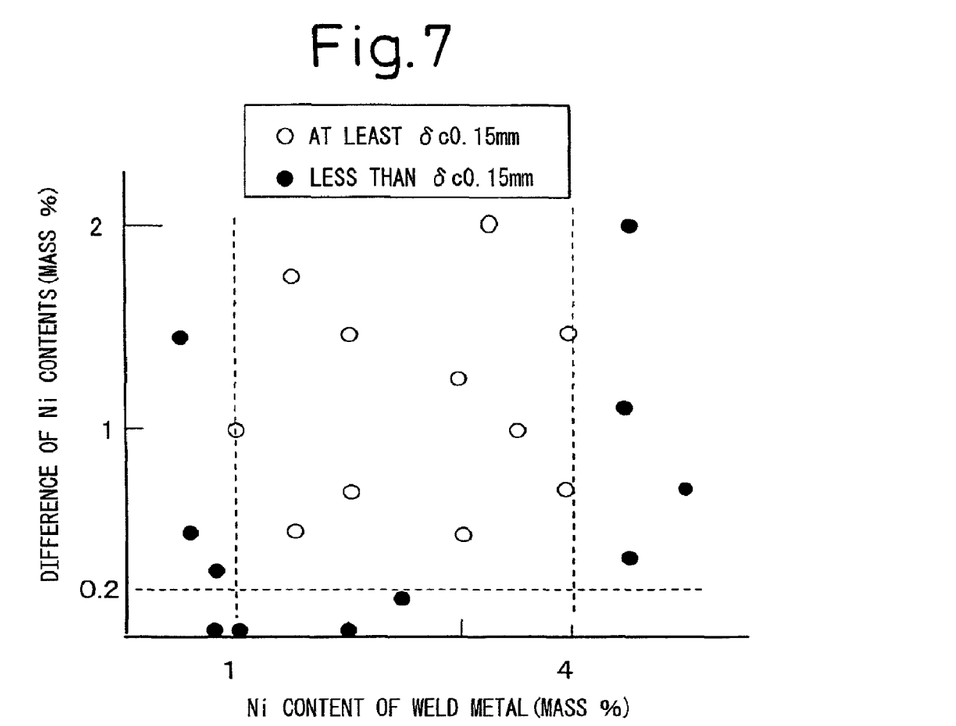
FIG. 7 is a view showing the relationship between the amount of Ni of the weld metal, the difference in amount of Ni of the weld metal and base material steel plate, and the fracture toughness value δc.

From FIG. 7, it is learned that when the Ni content in the weld metal is in the range of 1 to 4 mass % and is 0.2 mass % or more greater than the Ni content of the base material, the required CTOD value can be secured at both the WM and FL, HAZ.

Furthermore, the inventors measured the hardnesses of the weld metal and base material and the changes in hardnesses around the FL for the examples where CTOD values of 0.15 mm or more could be secured at both the WM and FL, HAZ, whereupon they confirmed that the hardnesses of the weld metal were within a range of over 110% to 220% of the hardnesses of the base material.

From the above results, it is learned that in a welded joint formed by electron beam welding using an insert metal, easing the local stress at the FL and making the Ni content of the weld metal 1 to 4 mass % and 0.2 mass % or more greater than the content of the base material are effective for securing the CTOD value.

The steel material forming the base material may be one produced from the above-mentioned steel for welded structure use of the known composition of ingredients or steel without Ni particularly added.

Further, at the time of welding, it is necessary to arrange an insert metal containing Ni at the abutting parts or include Ni in the weld metal of the welded joint in an amount of 1 to 4 mass % and more than 0.2 mass % or more of the Ni content of the base material. As the insert metal, one of a composition satisfying these conditions is necessary, but the invention is not particularly limited to any specific composition of ingredients.

For example, an Fe alloy containing C: 0.01 to 0.06%, Si: 0.2 to 1.0%, Mn: 0.5 to 2.5%, Ni: 50% or less, Mo: 0 to 0.30%, Al: 0 to 0.3%, Mg: 0 to 0.30%, Ti: 0.02 to 0.25%, and B: 0.001% or less may be illustrated, but in particular the content of Ni must be selected in consideration of the chemical ingredients of the steel material forming the weld base material so as to obtain a weld metal with an average concentration satisfying the conditions of the present invention.

Further, when including Ni in the weld metal, it is preferable to include B in the weld metal in an amount of 10 ppm or less. B has the action of suppressing formation of grain boundary ferrite and improving the toughness of the weld metal, but considering high temperature cracking and other points is made 10 ppm or less.

The B may be added by the method of addition from the steel material forming the base material or from the insert metal. Note that the above difference in hardnesses is achieved by making the Ni content of the weld metal satisfy the conditions of the present invention, then suitably adjusting the balance between the ingredients of the steel material forming the base material and the weld metal formed using the insert metal or adjusting the cooling rates after welding so as to prevent the hardness of the weld metal from becoming too high.

(C) Case of Using Insert Metal (High Ni Steel Material)

In this regard, a steel material containing Ni in an amount of 2.5 mass % or more, having a higher strength, and excellent in toughness at a low temperature has been being used.

In a welded joint using such a steel material having a high Ni content, with just the means of adjusting the ratio of the hardness of the weld metal and the hardness of the base material, sometimes it was not possible to secure a more excellent fracture toughness value δc of the welded joint.

Therefore, to investigate the effects of the Ni content of the weld metal, the inventors prepared two types of steel plates, that is, steel plate containing Ni in 3 mass % and steel plate not containing Ni, inserted insert metal foils of a plurality of Fe—Ni alloys with different Ni contents or pure Ni in the weld abutting parts, and electron beam welded them. Further, they obtained test specimens from the welded joints after welding, provided notches at the weld metal (WM) and HAZ side of the FL (FL, HAZ), and ran CTOD tests to measure the fracture toughness values δc and measure the Ni concentrations of the weld metal.

Based on the obtained measurement results, they plotted the fracture toughness values δc of the WM and the FL, HAZ with respect to the Ni content in the weld metal. The results are shown in FIG. 8.

Figure 8:
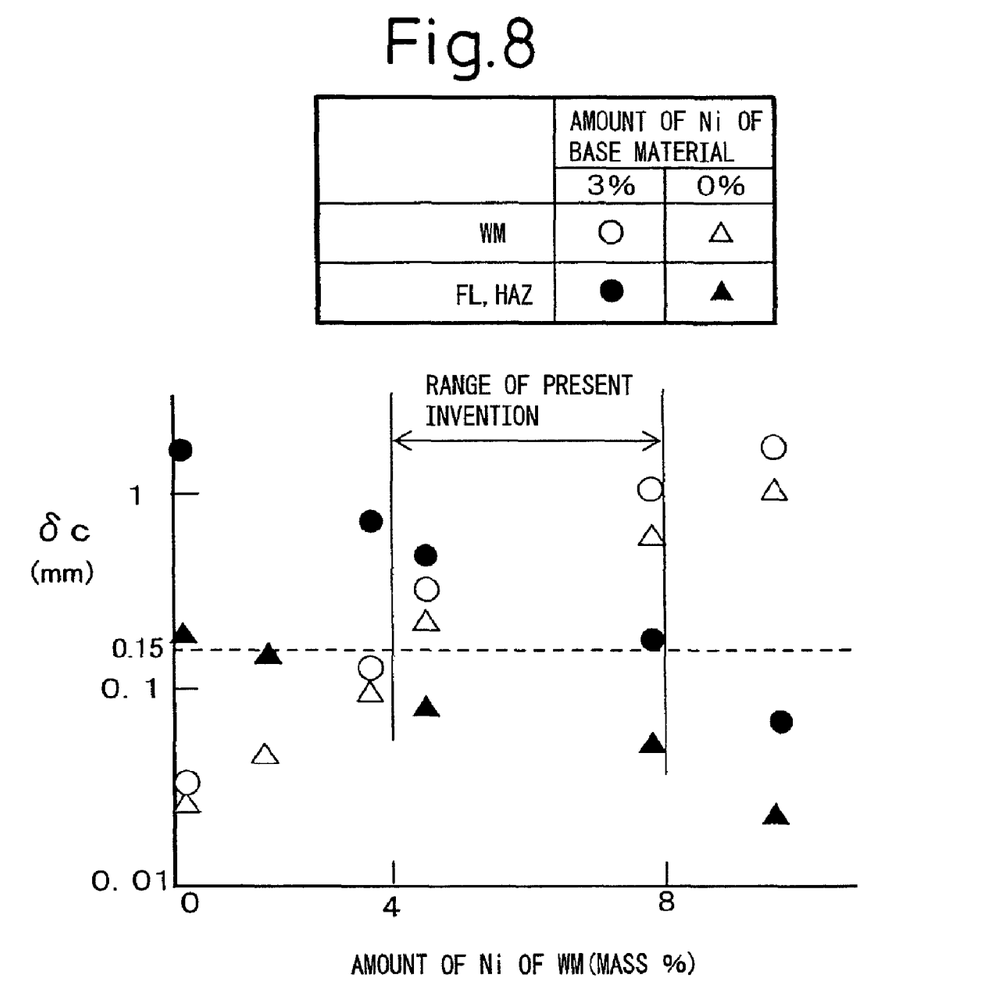
FIG. 8 is a view showing the effects of the Ni content in the weld metal on the fracture toughness value δc of the weld metal and the FL, HAZ.

From FIG. 8, it is learned that in the case of steel plates having an Ni content of 3%, with ones with Ni contents of the weld metal (WM) in the range of over 4% to 8%, it is possible to secure CTOD values of 0.15 mm or more for both the WM (○) and FL, HAZ (●), but with ones of other ranges, only a low CTOD value of less than 0.15 mm can be obtained in either of the WM or FL, HAZ.

Further, in the case of steel plates not containing Ni, both the WM (Δ) and the FL, HAZ (black Δ) failed to exhibit CTOD values of 0.15 mm or more.

Note that the target δc value was similarly made 0.15 mm or more.

Furthermore, the inventors measured the hardnesses of the weld metal and base material of the examples where CTOD values of 0.15 mm or more could be secured at both the WM and the FL, HAZ, whereupon they learned that the hardnesses of the weld metal were in the range of over 110% to 220% of the hardnesses of the base material.

From the above results, they learned that in an electron beam welded joint of a steel material with a high Ni content, easing the local stress at the FL and making the Ni content of the weld metal over 4% to 8% are effective for securing the CTOD value.

Here, as the steel material for forming the welded structure, high strength steel material containing Ni in 2.5 mass % or more is covered. As the high strength steel plate used, one made from steel for welded structures of known compositions of ingredients may also be used.

For example, steel having as basic ingredients, by mass %, C: 0.02 to 0.20%, Si: 0.01 to 1.0%, Mn: 0.3 to 2.0%, Al: 0.001 to 0.20%, N: 0.02% or less, P: 0.01% or less, S: 0.01% or less, and Ni: 2.50 to 9.0% and containing, in accordance with the improvement in the base material strength or joint toughness or other required properties, one or more of Cr, Mo, Cu, W, Co, V, Nb, Ti, Zr, Ta, Hf, REM, Y, Ca, Mg, Te, Se, and B in a total of 8% or less may be used.

Further, at the time of welding, it is necessary to place an insert metal comprised of Ni at the abutting parts and perform the welding so that the weld metal at the welded joint contains Ni in over 4% to 8% (mass %).

To obtain a structure enabling toughness to be stably secured even if the crystal grains coarsen or the oxides are reduced in number in the region melted by the electron beam when it resolidifies, it is necessary to include Ni in an amount over 4%. Further, if including Ni in over 8 mass %, the hardness of the weld metal increases too much and it becomes difficult to obtain a ratio of hardness of the weld metal and the base material of 220% or less.

As the insert metal, it is convenient to use foil comprised of pure Ni.

Based on the Ni content of the steel material forming the base material, the target Ni content in the weld metal, and the dimensions of the steel material, the thickness of the pure Ni foil required for obtaining the target Ni content is calculated and a foil of such a thickness is prepared or a plurality of thin foils are superposed to give the required thickness so as to prepare the insert metal.

The hardness of the weld metal is adjusted to become over 110% to 220% of the hardness of the base material and, furthermore, the content of the Ni contained in the weld metal of the welded joint is made, by mass %, over 4% to 8%.

For this reason, it is important to suitably adjust the balance of ingredients between the steel material forming the base material and the weld metal formed using the insert metal or to adjust the cooling rate after welding so as to prevent the weld metal from becoming too high in hardness.

Below, the present invention will be explained based on examples, but the conditions in the examples are examples of conditions employed for confirming the workability and effects of the present invention. The present invention is not limited to these examples. So long as not departing from the gist of the present invention and achieving the object of the present invention, the present invention can employ various other conditions or combinations of conditions.

EXAMPLE 1

The inventors prepared thick steel plates containing the components shown in Table 1, having balances of Fe and unavoidable impurities, and having plate thicknesses of 50 to 100 mm, inserted Fe—Ni alloy insert metal containing the ingredients shown in Table 2 and having a balance of Fe and unavoidable impurities into the groove parts or did not insert metal, butt welded them by electron beam welding, then tested and investigated the features and performances of the welded joints formed.

The results are shown in Table 3.

The Hv(BM) is the average value of hardness of the base material in the direction of plate thickness measured by a 10 kg indentation. The Hv(WM) is the value of the hardness of the weld metal at the center of plate thickness measured by a 10 kg indentation.

The bead width is the average value measured at the three points of the front surface and back surface of the weld metal and the center of plate thickness.

The HAZ softening width is the width of the region when measuring the HAZ region softened 5% from the hardness of the base material from the fusion line in the direction of the base material.

The prior γ grain size of the HAZ expresses the size of the prior austenite grains at the HAZ contacting the fusion line by the circle equivalent diameter.

Regarding the performance of the welded joint, δc (mm) is the value found at a test temperature of −10° C. in the above-mentioned CTOD test.

The joint tensile strength (MPa) is the result of a joint tensile test performed on an NKU No. 1 test specimen and shows the breakage strength.

As shown in Table 1, Invention Example Nos. 1 to 15 have the various conditions within the ranges prescribed by the present invention and exhibit sufficient δc values.

Among these invention examples, Nos. 1 to 14 have Hv(WM)/Hv(BM) values and bead width/plate thicknesses and HAZ softening widths within the ranges prescribed in the present invention, so exhibit sufficient values both for the δc values of the HAZ of the welded joints and the joint tensile strength.

Note that Invention Example No. 14 has a width of HAZ softening smaller than the preferable range, so the δc value is somewhat lower compared with Invention Example Nos. 1 to 13, but is an excellent value of at least 0.1 mm.

Invention Example No. 15 has an Hv(WM)/Hv(BM) lower than the preferable range, so is insufficient in hardenability of the weld metal and could not suppress the formation of pro-eutectoid ferrite. The δc characteristic of the HAZ is of a lower level compared with Invention Example Nos. 1 to 14.

As opposed to this, Comparative Example Nos. 16, 18 to 20, and 22 have Hv(WM)/Hv(BM) values over the range prescribed in the present invention, so the δc values of the weld metal are sufficient, but the δc values of the HAZ and FL become low.

Further, Comparative Example Nos. 17 and 21 had Hv(WM)/Hv(BM) values lower than the range prescribed by the present invention, so sufficient hardenability could not be secured and the δc values of the weld metal fell.

Therefore, the present invention is applied to secure the δc value in high strength steel having an YP or 355 MPa or more at a thick region of plate thickness of 50 mm or more.

TABLE 1

(mass %)

| Steel type | C | Si | Mn | P | S | Ni | Ti |
|---|---|---|---|---|---|---|---|
| YP36 | 0.11 | 0.19 | 1.23 | 0.006 | 0.003 | | 0.01 |
| YP40 | 0.05 | 0.15 | 1.8 | 0.003 | 0.004 | | |
| YP47 | 0.08 | 0.24 | 1.22 | 0.007 | 0.002 | 0.65 | 0.01 |
| YP56 | 0.06 | 0.14 | 1.61 | 0.005 | 0.002 | 1.21 | 0.01 |

TABLE 2

(mass %)

| Insert metal | C | Si | P | S | Ni |
|---|---|---|---|---|---|
| N1 | 0.02 | 0.01 | 0.002 | 0.010 | 0.50 |
| N2 | 0.01 | 0.21 | 0.004 | 0.001 | 1.20 |
| N3 | 0.03 | 0.02 | 0.003 | 0.002 | 4.00 |
| N4 | 0.01 | 0.12 | 0.008 | 0.003 | 8.00 |

TABLE 3

| | No. | Steel type | Plate thick. (mm) | Base meterial tensile strength (MPa) | Welding method | Vacuum (mbar) | Insert metal | Hv (BM) | Hv (WM) | Hv (WM)/ Hv (BM) | Beam width/ plate thick. | HAZ softening width (mm) | Prior γ grain size of HAZ (μm) | Weld metal δc (mm) | FL, HAZ δc (mm) | Joint tensile strength (MPa) |
|---|---|---|---|---|---|---|---|---|---|---|---|---|---|---|---|---|
| Inv. ex. | 1 | YP36 | 50 | 510 | Electron beam | 1 | N1 | 162 | 203 | 2.05 | 0.12 | 7 | 80 | 0.85 | 0.23 | 542 |
| | 2 | YP36 | 100 | 505 | Electron beam | 1 | N1 | 165 | 205 | 2.04 | 0.08 | 6 | 90 | 0.99 | 0.32 | 532 |
| | 3 | YP36 | 65 | 520 | Electron beam | 2 | N2 | 174 | 219 | 2.06 | 0.12 | 6 | 70 | 1.01 | 0.25 | 557 |
| | 4 | YP36 | 70 | 543 | Electron beam | 0.5 | N2 | 165 | 182 | 1.9 | 0.09 | 7 | 50 | 1.13 | 0.65 | 555 |
| | 5 | YP36 | 100 | 541 | Electron beam | 0.9 | N4 | 175 | 226 | 2.09 | 0.19 | 8 | 65 | 1.21 | 0.35 | 593 |
| | 6 | YP36 | 60 | 535 | Electron beam | 0.8 | None | 171 | 202 | 1.2 | 0.15 | 6 | 75 | 0.45 | 0.98 | 537 |
| | 7 | YP36 | 55 | 540 | Electron beam | 0.0002 | N2 | 169 | 179 | 1.86 | 0.16 | 5 | 55 | 0.65 | 0.75 | 542 |
| | 8 | YP40 | 70 | 570 | Electron beam | 0.002 | None | 185 | 228 | 1.32 | 0.18 | 7 | 55 | 0.75 | 1.02 | 596 |
| | 9 | YP40 | 80 | 565 | Electron beam | 0.001 | N3 | 187 | 234 | 2.05 | 0.1 | 4 | 45 | 0.85 | 0.42 | 600 |
| | 10 | YP40 | 65 | 555 | Electron beam | 1.2 | N2 | 186 | 238 | 2.08 | 0.12 | 4 | 58 | 1.05 | 0.32 | 570 |
| | 11 | YP47 | 75 | 610 | Electron beam | 2 | None | 204 | 263 | 1.25 | 0.13 | 3 | 75 | 0.52 | 1.22 | 620 |
| | 12 | YP47 | 80 | 580 | Electron beam | 2 | N2 | 206 | 260 | 2.06 | 0.12 | 4 | 180 | 1.02 | 0.23 | 621 |
| | 13 | YP56 | 100 | 634 | Electron beam | 1 | None | 201 | 239 | 1.23 | 0.2 | 3 | 90 | 0.16 | 1.32 | 641 |
| | 14 | YP56 | 55 | 640 | Electron beam | 10 | N2 | 203 | 260 | 2.08 | 0.08 | 2 | 55 | 0.98 | 0.21 | 696 |
| | 15 | YP56 | 70 | 635 | Electron beam | 1 | N2 | 204 | 173 | 1.05 | 0.09 | 4 | 150 | 0.21 | 1 | 459 |
| C. ex. | 16 | YP36 | 70 | 510 | Electron beam | 1 | N4 | 202 | 307 | 2.32 | 0.45 | 4 | 80 | 1.25 | 0.012 | 520 |
| | 17 | YP36 | 70 | 505 | Electron beam | 1 | None | 204 | 153 | 0.85 | 0.67 | 10 | 90 | 0.04 | 0.13 | 450 |
| | 18 | Y940 | 65 | 565 | Electron beam | 2 | N2 | 210 | 347 | 2.45 | 0.66 | 5 | 70 | 0.89 | 0.05 | 570 |
| | 19 | YP40 | 70 | 555 | Electron beam | 0.0001 | None | 204 | 377 | 2.65 | 1.2 | 6 | 160 | 0.55 | 0.032 | 560 |
| | 20 | YP40 | 80 | 560 | Electron beam | 1 | N3 | 210 | 452 | 2.95 | 0.8 | 3 | 170 | 0.23 | 0.025 | 562 |
| | 21 | YP47 | 100 | 620 | Electron beam | 1 | N2 | 200 | 162 | 0.81 | 0.5 | 6 | 210 | 0.08 | 0.12 | 550 |
| | 22 | YP47 | 100 | 615 | Electron beam | 1 | N1 | 210 | 307 | 2.26 | 0.8 | 7 | 240 | 0.55 | 0.025 | 620 |

EXAMPLE 2

The inventors prepared thick steel plates containing the ingredients shown in Table 4, having balances of Fe and unavoidable impurities, and having plate thicknesses of 50 to 100 mm, butt welded them by electron beam welding, then tested and investigated the features and performances of the welded joints formed.

The results are shown in Table 5.

In Table 5, Hv (BM), Hv (WM), and δc (mm) were found in the same way as Example 1. Note that the same is true for the later explained Examples 3 and 4 as well.

As shown in Table 5, Invention Example Nos. 1 to 15 had values of Hv(WM)/Hv(BM), chemical components of the steel materials, and amounts of oxygen and amounts of oxides in the weld metal all within the ranges defined by the present invention. The δc values were sufficient in all of the weld metal and the FL, HAZ.

Note that Invention Example Nos. 5, 6, 12, and 13 had larger numbers of oxides having grain sizes of 2 μm or more, so the δc values of the weld metal were low.

As opposed to this, Comparative Example 16 had an amount of C of the steel material and a Pcm value of more than the prescribed values of the present invention, had a value of Hv(WM)/Hv(BM) of more than the range of the present invention, and had a number of oxides of a grain size of 0.1 to 2 μm of less than the prescribed value of the present invention, so the weld metal and the FL, HAZ were all insufficient in δc value.

Comparative Example 17 had an Hv(WM)/Hv(BM) value and Pcm of the steel material of less than the prescribed values of the present invention and had a number of oxides of a grain size of 2 μm or more of more than the prescribed value of the present invention or more, so the δc value of the weld metal was insufficient.

Comparative Example 18 had an Hv(WM)/Hv(BM) value and Pcm of the steel material of less than the prescribed values of the present invention and had a number of oxides of a grain size of 0.1 to 2 μm of less than the prescribed values of the present invention, so was insufficient in the δc value of the weld metal.

TABLE 4

| | Steel material No. | C | Si | Mn | P | S | Ni | Cu | Ti | B | Al | Ca | Mg | Cr | Mo | Pcm |
|---|---|---|---|---|---|---|---|---|---|---|---|---|---|---|---|---|
| Inv. ex. | 1 | 0.11 | 0.19 | 1.23 | 0.006 | 0.003 | | | 0.01 | | | | | | | 0.18 |
| | 2 | 0.05 | 0.15 | 1.8 | 0.003 | 0.004 | | | 0.02 | 0.0008 | | | | | | 0.15 |
| | 3 | 0.08 | 0.24 | 1.22 | 0.007 | 0.002 | 0.65 | | 0.01 | | | | | | | 0.16 |
| | 4 | 0.06 | 0.14 | 1.61 | 0.005 | 0.002 | 1.21 | | 0.01 | | | | | | | 0.17 |
| | 5 | 0.04 | 0.2 | 1.81 | 0.004 | 0.002 | 0.9 | 0.9 | 0.02 | | 0.006 | 0.00015 | | 0.1 | | 0.20 |
| | 6 | 0.021 | 0.2 | 2.2 | 0.004 | 0.002 | | | 0.02 | 0.0012 | 0.006 | 0.00015 | | | 0.1 | 0.14 |
| | 7 | 0.08 | 0.2 | 1.81 | 0.004 | 0.002 | 3 | 3 | 0.02 | | 0.006 | | 0.00012 | | | 0.38 |
| Comp. ex. | 8 | 0.25 | 0.14 | 1.61 | 0.005 | 0.002 | 1.21 | | 0.01 | | | | | | | 0.36 |
| | 9 | 0.021 | 0.2 | 1.1 | 0.004 | 0.002 | 0.3 | 0.3 | 0.02 | | 0.006 | 0.00015 | | | | 0.10 |

TABLE 5

| | | Electron beam butted welded joint | | | | | | | Features of welded joint | | | | | |
|---|---|---|---|---|---|---|---|---|---|---|---|---|---|---|
| | | | | | Base material tensile strength (MPa) | | | | | | Am't of oxygen in weld metal (ppm) | Oxides of grain size of 2 μm or more/ mm² | Oxides of grain size of 0.1 to less than 2 μm/mm² | Performance of welded joint | |
| | No. | Steel material No. | Steel material Pcm | Plate thick. (mm) | | Vacuum (mbar) | Insert metal | Hv (BM) | Hv (WM)/ Hv (BM) | Bead width/ plate thick. | | | | Weld metal δc (mm) at −10° C. | FL, HAZ δc (mm) at −10° C. |
| Inv. ex. | 1 | 1 | 0.18 | 100 | 525 | 1 | None | 175 | 1.3 | 0.18 | 22 | 2 | 100 | 0.99 | 0.32 |
| | 2 | 1 | 0.18 | 65 | 535 | 2 | None | 180 | 1.2 | 0.19 | 50 | 3 | 250 | 1.01 | 0.25 |
| | 3 | 1 | 0.18 | 70 | 543 | 0.5 | None | 185 | 1.3 | 0.12 | 45 | 5 | 55 | 1.13 | 0.65 |
| | 4 | 2 | 0.15 | 100 | 505 | 0.9 | None | 170 | 1.11 | 0.11 | 35 | 4 | 35 | 1.21 | 0.35 |
| | 5 | 2 | 0.15 | 60 | 535 | 0.8 | None | 180 | 1.2 | 0.19 | 30 | 8 | 250 | 0.16 | 0.98 |
| | 6 | 2 | 0.15 | 55 | 512 | 0.0002 | None | 170 | 1.2 | 0.17 | 30 | 7 | 352 | 0.18 | 0.75 |
| | 7 | 3 | 0.16 | 70 | 560 | 0.002 | None | 190 | 1.4 | 0.18 | 70 | 1 | 125 | 0.75 | 1.02 |
| | 8 | 3 | 0.16 | 80 | 555 | 0.001 | None | 185 | 1.9 | 0.12 | 55 | 2 | 550 | 0.85 | 0.42 |
| | 9 | 3 | 0.16 | 65 | 550 | 1.2 | None | 185 | 2.2 | 0.14 | 40 | 1 | 250 | 1.05 | 0.32 |
| | 10 | 4 | 0.17 | 75 | 580 | 2 | None | 200 | 1.6 | 0.12 | 35 | 4 | 123 | 0.52 | 1.22 |
| | 11 | 4 | 0.17 | 80 | 580 | 2 | None | 195 | 1.11 | 0.13 | 30 | 2 | 450 | 1.02 | 0.23 |
| | 12 | 5 | 0.16 | 100 | 520 | 1 | None | 180 | 1.2 | 0.09 | 45 | 7 | 560 | 0.16 | 1.32 |
| | 13 | 5 | 0.16 | 55 | 580 | 10 | None | 195 | 1.15 | 0.19 | 50 | 9 | 120 | 0.17 | 0.21 |
| | 14 | 6 | 0.14 | 70 | 515 | 1 | None | 175 | 1.2 | 0.11 | 30 | 2 | 45 | 0.2 | 1 |
| | 15 | 7 | 0.23 | 70 | 650 | 1 | None | 220 | 1.2 | 0.12 | 25 | 3 | 50 | 0.21 | 0.15 |
| C. ex. | 16 | 8 | 0.36 | 70 | 680 | 1 | None | 202 | 2.5 | 0.13 | 35 | 0 | 25 | 0.05 | 0.012 |
| | 17 | 9 | 0.09 | 65 | 380 | 2 | None | 210 | 0.95 | 0.12 | 90 | 15 | 65 | 0.012 | 0.35 |
| | 18 | 9 | 0.09 | 70 | 375 | 0.0001 | None | 204 | 0.8 | 0.12 | 45 | 8 | 10 | 0.03 | 0.25 |

EXAMPLE 3

The inventors prepared thick steel plates containing the ingredients shown in Table 6, having balances of Fe and unavoidable impurities, and having plate thicknesses of 50 to 100 mm, inserted Fe—Ni alloy insert metal containing the ingredients shown in Table 7 and having a balance of Fe and unavoidable impurities or pure Ni insert metal into the groove parts, butt welded them by electron beam welding, then tested and investigated the features and performances of the welded joints formed.

The results are shown in Table 8. Note that the joint tensile strength (MPa) was found by preparing NKU No. 1 test specimens and running joint tensile tests and shows the breakage strength.

As shown in Table 8, Invention Example Nos. 1 to 15 have various conditions within the ranges prescribed by the present invention and exhibit sufficient δc values.

On the other hand, Comparative Example Nos. 16, 17, 19, and 20 had Ni contents in the weld metals of 1% or less. As a result, the δc's of the weld metals were insufficient.

Comparative Example Nos. 18, 21, and 22 had Ni contents in the weld metal of 4% or more, so the Hv(WM)/Hv(BM)'s were over 220. As a result, the δc's of the weld metals were sufficient, but the δc's of the FL, HAZ were insufficient.

TABLE 6

| Steel No. | C | Si | Mn | P | S | Ni | Ti |
|---|---|---|---|---|---|---|---|
| | | | | (mass %) | | | |
| 1 | 0.11 | 0.19 | 1.23 | 0.006 | 0.003 | | 0.01 |
| 2 | 0.05 | 0.15 | 1.8 | 0.003 | 0.004 | | |
| 3 | 0.08 | 0.24 | 1.22 | 0.007 | 0.002 | 0.65 | 0.01 |
| 4 | 0.06 | 0.14 | 1.61 | 0.005 | 0.002 | 1.21 | 0.01 |

TABLE 7

| Insert metal | C | Si | P | S | Ni |
|---|---|---|---|---|---|
| | | | (mass %) | | |
| N1 | 0.02 | 0.01 | 0.002 | 0.010 | 30 |
| N2 | 0.01 | 0.21 | 0.004 | 0.001 | 20 |
| N3 | 0.03 | 0.02 | 0.003 | 0.002 | 8 |
| N4 | 0.01 | 0.12 | 0.008 | 0.003 | 15 |
| N5 | | | | | 100 |

TABLE 8

| | No. | Steel type | Plate thick. (mm) | Base material tensile strength (MPa) | Vacuum (mbar) | Insert metal | A: Am't of Ni of base material (%) | Thick. of insert metal (mm) | B: Am't of Ni of weld metal (%) | B − A (%) | Hv (BM) | Hv (WM) | Hv (WM)/ Hv (BM) (%) | Bead with/ plate thick. | Weld metal δc (mm) | FL, HAZ δc (mm) | Joint tensile strength (MPa) |
|---|---|---|---|---|---|---|---|---|---|---|---|---|---|---|---|---|---|
| Inv. ex. | 1 | 1 | 50 | 510 | 1 | N1 | 0 | 0.44 | 1.1 | 2.2 | 162 | 203 | 125 | 0.12 | 0.75 | 0.42 | 536 |
| | 2 | 1 | 100 | 505 | 1 | N1 | 0 | 0.59 | 2.2 | 2.2 | 165 | 205 | 124 | 0.08 | 0.88 | 0.36 | 526 |
| | 3 | 1 | 65 | 520 | 2 | N2 | 0 | 0.98 | 2.5 | 2.5 | 174 | 219 | 126 | 0.12 | 0.75 | 0.52 | 550 |
| | 4 | 1 | 70 | 543 | 0.5 | N2 | 0 | 1.01 | 3.2 | 3.2 | 165 | 264 | 160 | 0.09 | 0.65 | 0.45 | 730 |
| | 5 | 1 | 100 | 541 | 0.9 | N4 | 0 | 4.94 | 3.9 | 3.9 | 175 | 368 | 210 | 0.19 | 1.02 | 0.18 | 954 |
| | 6 | 1 | 60 | 535 | 0.8 | N5 | 0 | 0.34 | 3.8 | 3.8 | 171 | 325 | 190 | 0.15 | 1.14 | 0.16 | 854 |
| | 7 | 1 | 55 | 540 | 0.0002 | N2 | 0 | 0.53 | 1.2 | 1.2 | 169 | 179 | 106 | 0.16 | 0.42 | 0.79 | 481 |
| | 8 | 2 | 70 | 570 | 0.002 | N5 | 0 | 0.49 | 3.9 | 3.9 | 185 | 389 | 210 | 0.18 | 1.23 | 0.17 | 1005 |
| | 9 | 2 | 80 | 565 | 0.001 | N3 | 0 | 1.10 | 1.5 | 1.1 | 187 | 202 | 108 | 0.1 | 0.32 | 0.95 | 513 |
| | 10 | 2 | 65 | 555 | 1.2 | N2 | 0 | 0.47 | 1.2 | 1.2 | 186 | 223 | 120 | 0.12 | 1.05 | 0.46 | 559 |
| | 11 | 3 | 75 | 610 | 2 | N2 | 0.65 | 0.76 | 2.2 | 1.55 | 204 | 263 | 129 | 0.13 | 0.86 | 0.36 | 661 |
| | 12 | 3 | 80 | 580 | 2 | N2 | 0.65 | 1.03 | 2.8 | 2.15 | 206 | 260 | 126 | 0.12 | 0.42 | 0.63 | 614 |
| | 13 | 4 | 100 | 634 | 1 | N5 | 1.21 | 0.52 | 3.8 | 2.59 | 201 | 291 | 145 | 0.2 | 0.96 | 0.45 | 772 |
| | 14 | 4 | 55 | 640 | 10 | N2 | 1.21 | 0.50 | 3.5 | 2.29 | 203 | 260 | 128 | 0.08 | 0.23 | 0.85 | 688 |
| | 15 | 4 | 70 | 635 | 1 | N2 | 1.21 | 0.78 | 3.7 | 2.49 | 204 | 282 | 138 | 0.09 | 0.78 | 0.55 | 736 |
| C. ex. | 16 | 1 | 70 | 510 | 1 | N4 | 0 | 0.06 | 0.1 | 0.1 | 162 | 156 | 96 | 0.12 | 0.03 | 0.23 | 520 |
| | 17 | 1 | 70 | 505 | 1 | None | 0 | None | 0 | 0 | 162 | 143 | 88 | 0.15 | 0.04 | 0.31 | 520 |
| | 18 | 2 | 65 | 565 | 2 | N5 | 0 | 0.62 | 6 | 6 | 174 | 557 | 320 | 0.16 | 0.95 | 0.02 | 570 |
| | 19 | 2 | 70 | 555 | 0.0001 | None | 0 | None | 0 | 0 | 175 | 166 | 95 | 0.15 | 0.04 | 0.45 | 560 |
| | 20 | 2 | 80 | 560 | 1 | N3 | 0 | 0.60 | 0.4 | 0.4 | 173 | 190 | 110 | 0.15 | 0.11 | 0.52 | 562 |
| | 21 | 3 | 100 | 620 | 1 | N2 | 0.65 | 1.93 | 4.5 | 3.85 | 200 | 560 | 280 | 0.1 | 0.84 | 0.03 | 550 |
| | 22 | 3 | 100 | 615 | 1 | N5 | 0.65 | 1.47 | 8 | 7.35 | 201 | 643 | 320 | 0.2 | 0.93 | 0.02 | 620 |

EXAMPLE 4

The inventors prepared thick steel plates containing the ingredients shown in Table 9, having balances of Fe and unavoidable impurities, and having plate thicknesses of 50 to 100 mm, inserted Ni insert metal (NA) or Ni—Fe alloy insert metal (NB, NC) comprised of the ingredients shown in Table 10 into the groove parts, butt welded them by electron beam welding, then tested and investigated the features and performances of the welded joints formed.

The test results are shown together with the conditions of the welded joints etc. in Table 11. Note that the joint tensile strength (MPa) is obtained by a test similar to Example 3.

As shown in Table 11, Invention Example Nos. 1 to 15 have the various conditions within the range prescribed in the present invention and have sufficiently high δc values in the weld metal and in the FL, HAZ.

As opposed to this, Comparative Example Nos. 16 to 19 have high Ni contents in the weld metal of 8% or more, so the Hv(WM)/Hv(BM) values become more than 220% and as a result the δc's of the weld metals are sufficiently high values, but the δc's of the FL, HAZ are extremely low values.

TABLE 9

| Steel Material No. | C | Si | Mn | P | S | Ni | Ti |
|---|---|---|---|---|---|---|---|
| 1 | 0.11 | 0.19 | 1.23 | 0.006 | 0.003 | 2.5 | 0.01 |
| 2 | 0.05 | 0.15 | 1.8 | 0.003 | 0.004 | 3.5 | |
| 3 | 0.08 | 0.24 | 1.22 | 0.007 | 0.002 | 5.5 | 0.01 |
| 4 | 0.06 | 0.14 | 1.61 | 0.005 | 0.002 | 4.2 | 0.01 |

(mass %)

TABLE 10

(mass %)

| Insert metal | C | Si | P | S | Ni |
|---|---|---|---|---|---|
| NA | 0.02 | 0.01 | 0.002 | 0.010 | 99 |
| NB | 0.01 | 0.21 | 0.004 | 0.001 | 70 |
| NC | 0.03 | 0.02 | 0.003 | 0.002 | 50 |

TABLE 11

| | No. | Steel type | Plate thick. (mm) | Base material tensile strength (MPa) | Vacuum (mbar) | Insert metal | A: Am't of Ni of base material (%) | Thick. of insert metal (mm) | B: Am't of Ni of weld metal (%) | B − A (%) | Hv (BM) | Hv (WM) | Hv (WM)/Hv (BM) (%) | Bead with/plate thick. | Weld metal δc (mm) | FL, HAZ δc (mm) |
|---|---|---|---|---|---|---|---|---|---|---|---|---|---|---|---|---|
| Inv. ex. | 1 | 1 | 50 | 510 | 1 | NA | 2.5 | 0.2 | 6.2 | 3.7 | 185 | 352 | 190 | 0.12 | 0.74 | 0.23 |
| | 2 | 1 | 100 | 505 | 1 | NA | 2.5 | 0.3 | 5.9 | 3.4 | 185 | 333 | 180 | 0.08 | 0.88 | 0.31 |
| | 3 | 1 | 65 | 520 | 2 | NB | 2.5 | 0.6 | 7.8 | 5.3 | 185 | 407 | 220 | 0.12 | 0.71 | 0.25 |
| | 4 | 1 | 70 | 543 | 0.5 | NB | 2.5 | 0.5 | 8 | 5.5 | 185 | 389 | 210 | 0.09 | 0.72 | 0.29 |
| | 5 | 1 | 100 | 541 | 0.9 | NA | 2.5 | 0.3 | 4.1 | 1.6 | 185 | 204 | 110 | 0.19 | 0.42 | 0.83 |
| | 6 | 1 | 60 | 535 | 0.8 | NA | 2.5 | 0.2 | 4.3 | 1.8 | 185 | 222 | 120 | 0.15 | 0.34 | 0.92 |
| | 7 | 1 | 55 | 540 | 0.0002 | NB | 2.5 | 0.4 | 5.3 | 2.8 | 185 | 361 | 195 | 0.16 | 0.58 | 0.32 |
| | 8 | 2 | 70 | 570 | 0.002 | NA | 3.5 | 0.3 | 6.2 | 2.7 | 195 | 410 | 210 | 0.18 | 0.54 | 0.43 |
| | 9 | 2 | 80 | 565 | 0.001 | NC | 3.5 | 0.4 | 5.8 | 2.3 | 195 | 400 | 205 | 0.1 | 0.39 | 0.28 |
| | 10 | 2 | 65 | 555 | 1.2 | NB | 3.5 | 0.4 | 7.4 | 3.9 | 195 | 332 | 170 | 0.12 | 0.63 | 0.72 |
| | 11 | 3 | 75 | 610 | 2 | NB | 5.5 | 0.3 | 8 | 2.5 | 208 | 343 | 165 | 0.13 | 0.48 | 0.72 |
| | 12 | 3 | 80 | 580 | 2 | NB | 5.5 | 0.1 | 6.2 | 0.7 | 208 | 229 | 110 | 0.12 | 0.36 | 1.02 |
| | 13 | 4 | 100 | 634 | 1 | NA | 4.2 | 0.3 | 5.9 | 1.7 | 200 | 230 | 115 | 0.2 | 0.41 | 1.12 |
| | 14 | 4 | 55 | 640 | 10 | NB | 4.2 | 0.1 | 6.3 | 2.1 | 201 | 271 | 135 | 0.08 | 0.25 | 0.94 |
| | 15 | 4 | 70 | 635 | 1 | NB | 4.2 | 0.2 | 6.8 | 2.6 | 201 | 285 | 142 | 0.09 | 0.65 | 0.74 |
| C. ex. | 16 | 1 | 70 | 510 | 1 | NA | 2.5 | 0.40 | 9.5 | 7 | 185 | 463 | 250 | 0.08 | 1.23 | 0.03 |
| | 17 | 2 | 65 | 565 | 2 | NA | 3.5 | 0.50 | 12 | 8.5 | 195 | 507 | 260 | 0.09 | 0.98 | 0.06 |
| | 18 | 2 | 80 | 560 | 1 | NC | 3.5 | 1.76 | 8.5 | 5 | 195 | 488 | 250 | 0.22 | 1.05 | 0.07 |
| | 19 | 3 | 100 | 620 | 1 | NB | 5.5 | 0.63 | 9.2 | 3.7 | 208 | 582 | 280 | 0.12 | 1.06 | 0.06 |

INDUSTRIAL APPLICABILITY

According to the present invention, in an electron beam welded joint of high strength steel plates having a strength and large plate thickness, even if weld defects are present or fatigue cracks occur and grow, there is resistance to brittle fracture, so it is possible to prevent critical damage and breakage such as the welded structure fracturing.

Accordingly, the present invention is an invention exhibiting the remarkable effect of remarkably enhancing the safety of welded structures and therefore has high value of utilization in industry.

The invention claimed is:

1. An electron beam welded joint excellent in brittle fracture resistance in a butt welded joint of a welded structure characterized in that a hardness of a weld metal is over 110% to 220% of a hardness of a base material and in that a width of the weld metal is 20% or less of a plate thickness of the base material, wherein said electron beam welded joint is characterized by containing, as a base material, by mass %, C: 0.02 to 0.2%, Mn: 0.8 to 3.5%, S: 0.0005 to 0.0025%, Al: less than 0.02%, and Ti: 0.01 to 0.05%, using a steel material having a value of Pcm expressed by the following formula (a) of 0.12% to 0.5% material, having an amount of O contained in the weld metal of the welded joint of 20 ppm or more, and similarly having an amount of oxides of a grain size of 2.0 μm or more of 10/mm² or less:

$$Pcm = C + Si/30 + Mn/20 + Cu/20 + Ni/60 + Cr/20 + Mo/15 + V/10 + 5B \quad (a).$$

2. An electron beam welded joint as set forth in claim 1, said electron beam welded joint characterized in that an amount of Ti oxides having a grain size of 0.1 μm to less than 2.0 μm is 30 to 600/mm².

3. An electron beam welded joint as set forth in claims 1 or 2, said electron beam welded joint characterized in that the weld metal of said welded joint contains Ni in an amount of 1 to 4 mass % and contains it in an amount 0.2 mass % or more greater than the content in the base material.

4. An electron beam welded joint as set forth in claim 3, said electron beam welded joint characterized in that the weld metal contains B in an amount of 10 ppm or less.

5. An electron beam welded joint as set forth in claims 1 or 2, said electron beam welded joint characterized in that said welded structure comprises high strength steel plates having a plate thickness of over 50 mm butt welded together.

6. An electron beam welded joint as set forth in claim 3, said electron beam welded joint characterized in that said welded structure comprises high strength steel plates having a plate thickness of over 50 mm butt welded together.

7. An electron beam welded joint as set forth in claim 4, said electron beam welded joint characterized in that said welded structure comprises high strength steel plates having a plate thickness of over 50 mm butt welded together.

8. An electron beam welded joint excellent in brittle fracture resistance in a butt welded joint of a welded structure characterized in that a hardness of a weld metal is over 110% to 220% of a hardness of a base material and in that a width of the weld metal is 20% or less of a plate thickness of the base material, wherein said electron beam welded joint is characterized by using as said base material a steel material containing Ni in an amount of 2.5 mass % or more and in that a content of Ni contained in the weld metal of said welded joint is, by mass %, over 4% to 8%.

9. An electron beam welded joint as set forth in claim 8, said electron beam welded joint characterized in that said welded structure comprises high strength steel plates having a plate thickness of over 50 mm butt welded together.

* * * * *